United States Patent [19]
Watson et al.

[11] Patent Number: 5,238,282
[45] Date of Patent: Aug. 24, 1993

[54] VEHICLE INTERIOR PARTITION

[76] Inventors: Michael J. Watson, 51 McMurchy Avenue North Apt. 510, Brampton, Ontario, Canada, L6X 1X7; Ronald E. Watson, 252 Kensington Place, Orangeville, Ontario, Canada, L9W 4H1

[21] Appl. No.: 840,129

[22] Filed: Feb. 24, 1992

[51] Int. Cl.$^5$ ............................................. B62D 33/04
[52] U.S. Cl. .................................................... 296/24.1
[58] Field of Search ............................ 296/24.1, 39.3; 98/2.05, 2.08

[56] References Cited

U.S. PATENT DOCUMENTS

| | | | |
|---|---|---|---|
| 3,632,154 | 1/1972 | Woodrich | 296/24.1 |
| 4,095,837 | 6/1978 | Hunter | 296/24.1 |
| 4,366,977 | 1/1983 | Davis et al. | 296/24.1 |
| 4,621,856 | 11/1986 | McKenzie | 296/24.1 |

Primary Examiner—Robert R. Song

[57] ABSTRACT

This invention relates to accessories for automobiles, vans, aircraft, minivans and station wagons and in particular to an improved partition comprised of a main support beam which requires no permanent attachment to the vehicle in which it is installed and from which is suspended generally from the roof to the floor transparent, semi-transparent or opaque curtain panels whose primary purpose is to substantially confine heated or cooled air or air containing smoke to a specific area of a vehicle. The device is adjustable, requiring no permanent alterations to fit the interior of a very large variety of vehicles of different descriptions, can be collapsed and folded while not in use and remains intact while being portable and can be installed anywhere along the length of a vehicle interior where trim moulding, flanges or extrusions of vehicle components or door hardware exists.

7 Claims, 3 Drawing Sheets

VEHICLE INTERIOR PARTITION

BACKGROUND TO THE INVENTION

Regardless of geographic location it is seldom possible to have ideal climatic conditions for driving any type of motor vehicle without resorting to the use of either air conditioning devices or heaters to provide the driver and passengers with a comfortable environment while they are in the vehicle. It is also a source of annoyance to non-smoking passengers or drivers of vehicles to share the same space as those who smoke tobacco.

The use of vehicles designed to carry more than just the driver or operator and possibly a front seat passenger results in the redundant heating or cooling of the unused portion of the vehicle's interior space. There is also a protracted waiting period for the area occupied by the driver and front seat passenger or passengers to reach a comfortable temperature.

The operation of heaters or air conditioners designed for multiple passenger or freight carrying vehicles often depends upon the employment of fans or blowers running at high speed to displace large volumes of air within a relatively large area compared to the space occupied by the driver and front seat passengers with resultant noise and direct current of cold or hot air which causes discomfort.

It is possible to eventually heat or cool the entire interior of a vehicle to a point where it is reasonably comfortable throughout, however this process takes time and the more extreme the temperature is outside the vehicle the longer the time required to achieve the desired result. Once the sought after temperature is reached the fans or blowers employed to distribute heated or cooled air must continue to operate, generating both noise and annoying drafts.

The nature of vans or minivans is such that the unused space behind the front seat tends to create a drum like effect whereby sounds emitted by the rear differential gears and tires are amplified and transmitted to the front seat area. This is particularly noticeable where the space located behind the front seat is not equipped with upholstered seats, carpeting and fabric trim which tend to absorb sound.

Many models of minivans are being built with seats which fold down to become beds. These beds generally extend from behind the drivers seat rearward to the rear door or doors of the vehicle. The side windows of such vehicles are generally tinted to afford privacy and can be equipped with opaque curtains or blinds. The only area left open is that between the back of the front seat and the forward area of the vehicle. This open area interferes with the privacy of the area of the vehicle which is equipped with sleeping facilities.

Various devices have been constructed, and various methods employed in order to confine heated or cooled air to the forward area of a vehicle.

For example U.S. Pat. No. 3,632,154 granted to Woodrich Jan. 4, 1972 discloses a device for retaining heated air in the operator's compartment of a van.

Moreover U.S. Pat. No. 4,095,837 granted to Hunter Jun. 20, 1978 discloses apparatus for segregating the air space within the passenger compartment of an automobile.

Yet another device is disclosed in Canadian Patent No. 1 227 233 granted to W/S Group Inc. Sep. 22, 1987 in which a device is employed to form a partition having safety and energy conservation purposes.

These and other prior art devices present relatively complicated structures which involve a degree of difficulty for installation and further require alteration or modification of the vehicles in which they are installed presenting the possibility of unsightly damage when they are removed. If transferred to other vehicles of different design, modification of the device is required or a different design is necessary for installation.

Further, the apparatus existent in the prior art is of a generally bulky nature requiring considerable space for storage within a vehicle, for packaging, or elsewhere when not in use.

In known partitions it is necessary for incorporation in the vehicle of permanently affixed or removably affixed beams located in the roof area and side brackets attached to the sides of the vehicle and fastened by means such as magnets or bolts, epoxy or other adhesives and the dependence upon a side panel, door post or the like located in a strategic position to receive the side brackets. Once installed these partitions cannot be adjusted.

Reference Hunter U.S. Pat. No. 4,095,837 which states in part "The headliner 42 has been slit, and a plurality of ferrous plates have been fixedly secured to the automobile roof 46 as also shown in FIG. 4. The ferrous plates 44 may be secured by epoxy or the like".

Partitions are also known which are dependent upon contact with the backrest of the seat of the vehicle in which they are installed in order to effectively divide the vehicle air space. Hunter, U.S. Pat. No. 4,095,837 referenced above, provides for a curtain which "is disposed in a touching relationship with the backrest effectively dividing the air space therebehind". Further, such known partitions are comprised of a plurality of side brackets for removable attachment to the opposed inner wall portions of automobiles.

Known partitions do not contain the elements of universality of use in vehicles in that they require forms of permanent alteration of certain of their own component parts in order to fit specific vehicles and once altered are unusable in other vehicles. As an example Hunter, United States patent mentioned herein previously provides for an "elongated support track" for support of a transparent curtain but does not allow for telescoping of such track to allow it to fit a variety of vehicle sizes nor is it comprised of two or more pieces which would permit the entire apparatus to be folded and stored or transported easily.

The patent granted to Hunter mentioned herein provides for a partition whose use in a variety of locations within any vehicle is substantially limited by the location of door posts, windows or hardware housings required for side door opening and closing apparatus and the back of the automobile seat against which it must come in contact to be effective. Certain conditions or a combination thereof must be met for the partition to be installed and since these conditions cannot always be met the use and full function of the known partition is substantially limited. The presence of trim mouldings and door hardware further interferes with the installation and/or operation of the known partition whose installation is reliant upon a surface clear of encumbrances in order to conform to the profile of the vehicle in which it is installed. The installation and use of the known partition depends upon a solid surface both along the top of the elongated track and along the edges of the side brackets to accommodate the magnets or other means for attachment.

Many minivans are constructed which incorporate overhead consoles containing lights and possibly air ducts which often extend backward from the windshield beyond the rear of the front seat and beyond the door posts of the vehicle. Such consoles render unusable known forms of partitions requiring contact with the back of a seat or which have a plurality of side brackets for removable attachment to the opposed inner wall portions of the vehicle since such plurality of side brackets would have to be aligned with door posts or other solid means of attachment.

Other known partitions such as that described in Canadian Patent No. 1 227 233 issued to MacKenzie Sep. 9, 1987 involve components which must be held in place through use of bolts, plates and tracks to create a rigid barrier, the primary purpose of which is to act as a safety device to prevent objects from striking persons seated in the front seat of a vehicle in the event of an accident. The patent issued to MacKenzie shows a partition whose users must make alterations to their vehicles to allow for installation. The patent so issued states in part "Of course, the fleet owner would permanently install plates in the floors of all of his vehicles, and tracks in the roofs of all of his vehicles as their installation must be secure and their cost is low compared with the cost of the partition panel itself".

SUMMARY OF THE INVENTION

It is an object of this invention to provide an improved vehicle interior partition the broadest aspect of which will substantially confine heated or cooled air or air containing smoke to a certain area of a vehicle while overcoming the noted disadvantages and others.

A prime object of the invention is to provide a barrier against the transfer of air which has been heated or cooled or which contains smoke and which can be quickly installed without the use of tools and without the need to employ bolts, glues or magnets for installation.

Another object of the invention is to provide a partition which can be installed in a vehicle without the need to alter the vehicle in any way including the eliminating the need to drill holes in the body or components of a vehicle for installation.

A further object is to provide a partition which is generally universal in its ability to be installed in a wide variety of vehicles taking advantage of existing trim moulding, seams, joints, door operating housings or the like to removably anchor the device.

Still another object is to provide a partition for providing privacy in a vehicle through the use of an optional opaque curtain which is easily removed or installed and is capable of being positioned in numerous locations throughout a vehicle.

A further object is to provide a partition which creates a barrier to the transfer of air from one area of a vehicle to another which can be folded into a package capable of storage in minimal space such as in the door pocket of a vehicle.

Still another object is to provide a barrier to the movement of air within a vehicle which is easily constructed and whose main components can be injection moulded of plastics or similar materials and materials which are readily available requiring very little alteration in order to become components of the end product.

It is still another object to provide a partition which is foldable and light in weight. Such a partition is easily packaged and transported to market locations where it occupies relatively little shelf or display area and is well suited to a product which in view of its light weight and relatively small package requirements can be marketed on a mail order basis. In addition the said partition is more convenient for storage when it is not employed in the vehicle.

Another object is to provide a portable barrier to the free movement of heated or cooled air or air containing smoke from one area of a vehicle to another without the need to alter the construction of the partition through trimming of material or cutting of component parts thereby giving the partition the properties more closely defined as universally fitting.

Another object is to provide a partition which acts as a barricade to the movement of air which does not depend upon contact with the seats located in the vehicle to function and which does not have to be located in the immediate vicinity of a seat or seat back to function and which will act as a barrier to the movement of air in vehicles possessing a single front seat commonly known as a bench seat, single and separate front seats, single seats joined by a console and a variety of configurations of seating arrangements.

Still another object of the present invention is to provide a partition which in its various configurations contains transparent material such as clear vinyl the nature of which causes light passing through it to diffuse slightly without substantially reducing the clarity of view at night or in daylight thus reducing the glare caused by headlights shining through the rear window of the vehicle in which it is installed.

Another object of the invention is to provide a partition to the transfer of air within a vehicle which does not require the inclusion of materials whose properties such as magnetism may diminish substantially over the course of time or which may cause interference with the function of compasses or any electronic equipment which would be sensitive to magnetism.

Yet another object of the invention is to provide a barricade which in its various configurations is constructed of material of sufficient thickness and weight so as to deflect sound waves thereby reducing the transmission of sound emitted by rear wheels and tires, differential gears and the like generally known as road noise from the rear area of a vehicle to the area occupied by a driver and a passenger or passengers seated anywhere forward of the location of the partition.

Still another object of the invention is to provide a barrier to the movement air within a vehicle which will not cause damage to headlinings made of materials which are easily marred or crushed or which would be damaged as a result of having magnets pressed against them or by having pressure sensitive tapes such as that known as Velcro (TM) secured against them and in being removed cause the tearing away of fibres causing unsightly marring of the surface.

Yet another object of the invention is to provide a barricade to the passage of air from one area of a vehicle to another which may not be required at all times of the year or indeed may not be desired at all times or whose use may be confined to one trip and is therefor designed and constructed for simple and quick installation for short term or long term use and for removal or installation without the need for tools.

These objects as well as further objects and advantages of the present invention will become readily apparent after reading the description of a non-limiting illustrative embodiment and the accompanying drawings.

A partition for substantially limiting the flow of air and dampening sound and providing privacy between different areas located within the passenger compartment and/or freight carrying area of vehicles generally including but not limited to automobiles, vans, mini-vans, station wagons and delivery vans, relative to the driver and passenger seats thereof.

According to one aspect of the present invention there is included an elongated foldable main support beam consisting of a plurality of beam sections which are removably joined together generally in a telescopic fashion forming a single main support beam, to the distal ends of the main support beam are removably attached end brackets in a manner which allows telescoping of the support beam with the end brackets resulting in an main support beam the length of which in combination with the end brackets can be controlled and locked in place by thumb screw means which can be tightened without use of tools. In turn, spring clip means are removably attached to the end bracket means by bolt means secured by wing nut means or fastener means of the like which allow the bolts to traverse in a sliding fashion along a slot located in the end bracket means thereby allowing the spring clip means to be situated in a variety of positions relative to the end bracket means and relative to the main support beam. The spring clip means constructed of resilient material such as plastic, nylon or the like incorporate multiple prong means which can be tapered and which form a mouth to allow placement of the prongs of the spring clip means over the trim moulding, seams or protrusions of a vehicle thus permitting removable attachment of the partition to the trim or seams, metal or plastic protrusions of the vehicle and for the adjustment of the support beam in a wide variety of positions to achieve a close fit of the partition within the walls, ceiling and floor of the vehicle. Should different positions along the length of the trim, seams or other protrusion be required the spring clip means are capable of traversing the trim, seam or protrusion in a sliding manner allowing the partition to be located and held in the longitudinal position desired.

In accordance with another aspect of the invention there is permanently or removably attached to the forward edge of the support beam by adhesives means or other means including adhesive tape, rivets or screws or surface interlocking material means such as that available under the trade name Velcro (TM) the uppermost free edges of a number of flexible or semi-flexible panels of transparent or opaque material or opaque material a portion of which can be constructed of transparent material thereby providing a window within the panel.

The sections of the support beam are assembled to form a single support beam and panels attached thereto, their width being greater than the length of the pieces of the assembled beam overlap at the point where the beam sections are joined. Through surface tension means the material is allowed to form a closure which is further strengthened by attachment closure means such as metallic or plastic snap means or the like or lengths of surface tension fabric means such as that commonly known as Velcro (TM). Such attachment means are strategically located along the faces of the panels so as meet and when pressed together form a closure which can be opened or closed as required. The free ends of the panels extend to the floor of the vehicle or to any point between the ceiling and floor of the vehicle as desired or required.

According to another aspect of the invention the free sides of the flexible or semi-flexible panels which extend beyond the distal ends of the assembled beam are permanently or removably attached along the edge of the end brackets through means such as adhesives, pressure sensitive tapes, rivets, screws, surface interlocking material such as that known as Velcro (TM) or the like. In the preferred embodiment the means of attachment of the free sides of the panel consists of face plate means constructed of plastic or like material plates manufactured to assume the profile of the end brackets and held in position against the end bracket by means of self-tapping screws inserted through the face plates, through the free sides of the curtain and into the side of the end bracket thereby creating a clamp means which holds the curtain panel in place against the profile of the end bracket. Trimming of any material of which the panel is constructed which extends beyond the profile of the end bracket allows for neat fitting of the panel.

BRIEF DESCRIPTION OF THE DRAWINGS

In order that the present invention may be more fully understood it will now be described by way of example and in reference to accompanying drawings in which.

DESCRIPTION OF THE PREFERRED EMBODIMENTS

Like parts have been given like numbers throughout the figures.

Figure 1:
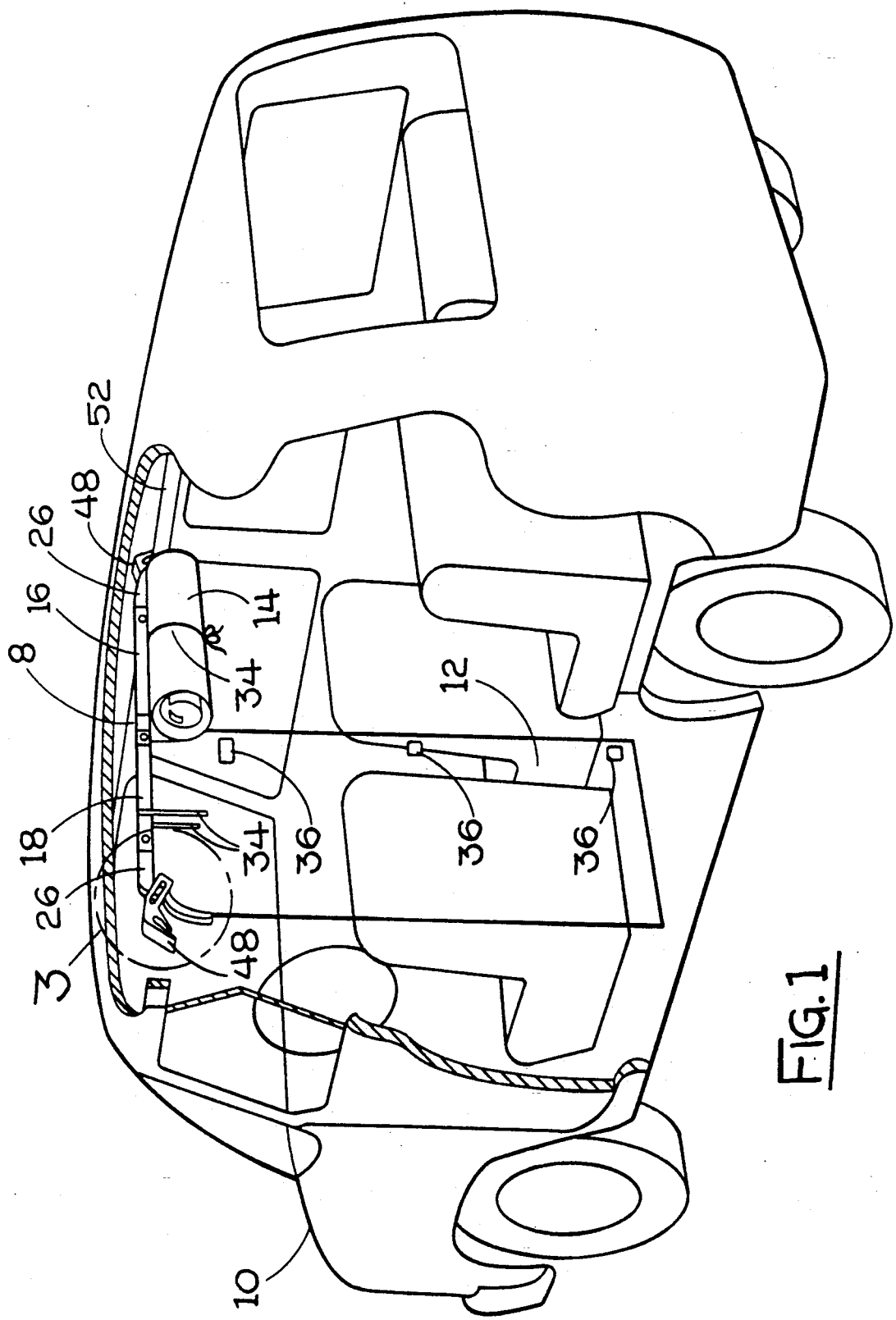
FIG. 1 is an oblique view of a vehicle in which the present invention in its preferred embodiment is installed in a typical vehicle such as a minivan. A section of the vehicle has been cut away to provide for a clearer view of the present invention.

In FIG. 1 there is illustrated a typical partition 6 shown mounted in a vehicle 10 in this instance the vehicle is a minivan, one side of which has been cut away to allow for a clear view of the invention. The partition 6 illustrated in FIG. 1 in whole or in part in FIG. 2, FIG. 3 and FIG. 4. is shown removably mounted in a location relative to the rear of the front seats of the vehicle 10 and with panel 14 of its panels 12 and 14 shown in a rolled up position. When both panels 12 and 14 are fully deployed the flow of air or air laden with smoke is substantially restricted with heated or cooled air being effectively confined to the area in which the source of emission of the cooled or heated air is located.

Figure 2:
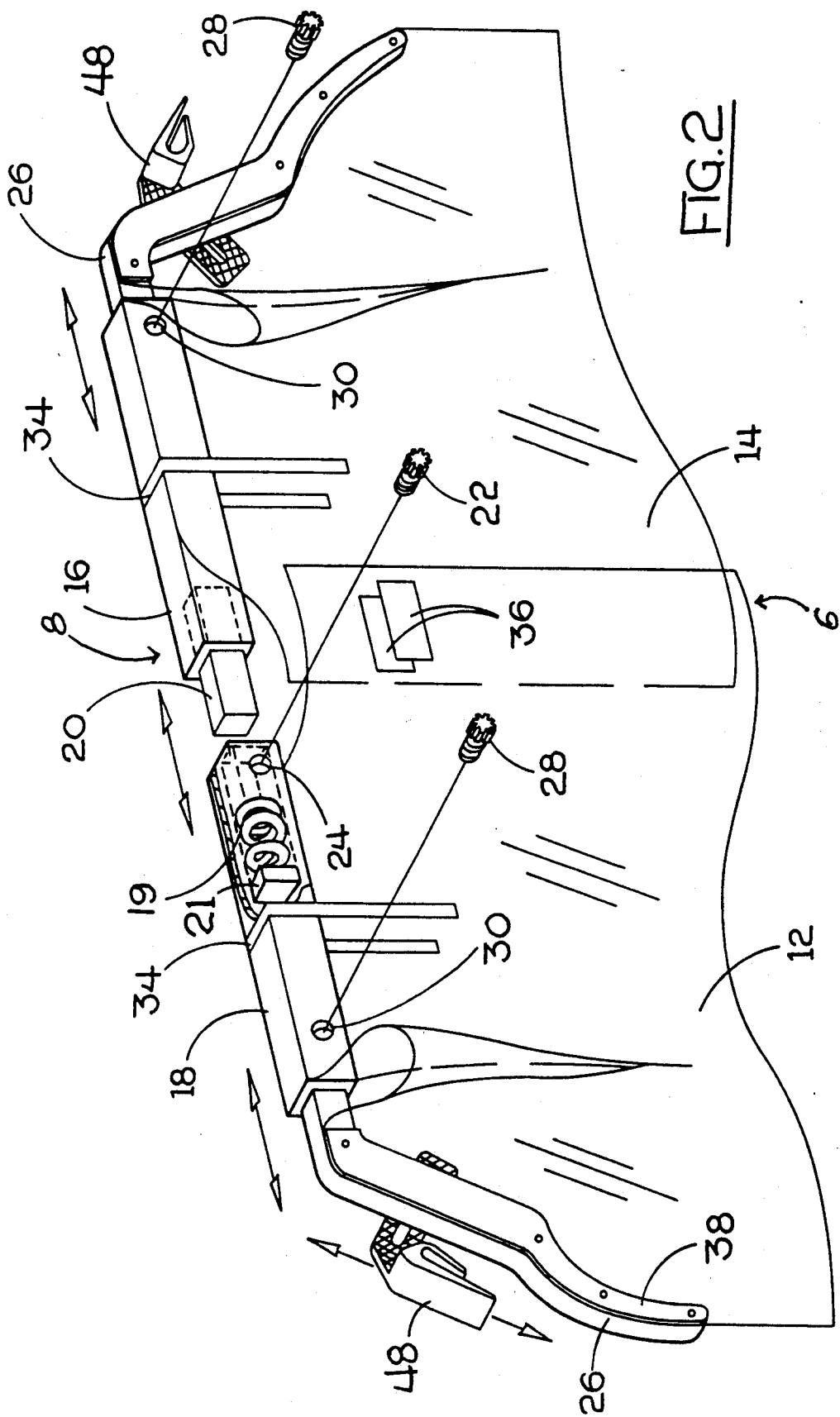
FIG. 2 is an oblique view of the present invention illustrating the relationship of the main support beam the beam sections, the end brackets and the spring clips to the entire assembly. This illustration includes a view of a coil spring located in a beam section, part of which has been cut away for purposes of illustration.

As shown in FIG. 2 the partition includes the main support beam 8 and a plurality of hollow beam sections 16 and 18. A plug means 20 constructed of material such as plastic, nylon or the like has been inserted and secured with glue, epoxy or such means of adhesive in one end of beam section 16. The plug means 20 is inserted to a depth sufficient only to allow a portion of its length to protrude. That portion of the plug 20 which protrudes from the end of beam section 16 is then removably inserted in one end of beam section 18 in a sliding telescopic manner. The plug 20 can be tight fitting or loose fitting and may be inserted either partially or to its full length, in the latter case the ends of beam section 16 will butt against one end of beam section 18. An opening 24 formed in the side wall of beam section 18 at a point adjacent to the end of the beam section 18 is so located as to receive a threaded thumb screw means 22 which when turned inwardly will lock against the plug means 20. The plug means 20 can be locked in positions along its length and by so doing permits extension or contraction of the combined length of beam sections 16 and 18.

A coil spring means 19 can be inserted inside the open end of the beam section 18 and held in place by a blocking plug means 21 thereby applying outward pressure against plug means 20 and hence through beam section 16 applying outward pressure to a plurality of end bracket means 26 which in the ideal embodiment are constructed of semi flexible material such as plastic or the like and which are constructed in such a shape and size as permit one end of the end bracket means to be inserted into the distal open free ends of beam 16 and beam 18 in a sliding telescopic manner. The depth to which the end bracket means 26 are inserted is determined by the length of the upper arm portion of the end bracket means 26 and those requirements for installation of the partition 6 between the side walls of the vehicle 10.

The locking of the end bracket means 26 in the preferred position is accomplished through the inward rotation of a threaded thumb screw means 28 which has been inserted through an opening 30 formed in the panel 12 and thence through an opening 32 formed in the outer wall of the beam section 16. When thumb screw means 28 is rotated inwardly it applies pressure to that portion of the end bracket means 26 which has been inserted in the open end of the beam section 16 thereby locking the end bracket means 26 in the desired position and providing a further method of controlling the length of main support beam 8. That area of the end bracket means 26 which is contacted or may come in contact with the thumb screw means 28 is knurled or dimpled to prevent slippage of the thumb screw means 28 when it is screwed into its locking position.

Panels 12 and 14 which are suspended from beam sections 16 and 18 are constructed in the preferred embodiment of a semi flexible transparent material such as clear vinyl or the like or can be made of opaque material with or without a window of semi flexible material included in its construction. Panels 12 and 14 are ideally constructed of material of sufficient weight and thickness as to withstand the rigors of temperature changes and the movement of air without becoming easily damaged or torn.

In this example of the invention the uppermost edges of the panels 12 and 14 are attached to the frontal edges of beam sections 16 and 18 by glue means, welding means or pressure sensitive tape means or removably attached by surface adhesion material means such as that sold under the name Velcro (TM). The panels 12 and 14 are suspended from the assembled beam sections 16 and 18 with the lower ends of the panels 12 and 14 when fully extended being at the floor level of the vehicle 10 or at a point between the partition 8 and the floor of the vehicle 10.

A tie back cord 34 means comprised of string, cord, a flexible ribbon or flexible length of material capable of adhering to an adhesive surface material such as that sold under the trade name Velcro TM is attached by glue means or welding means to the upper surface of beam sections 16 and 18 and allowed to extend down either side of the beam sections 16 and 18 from a point approximately in the middle of the beam section. Such tie back cord means 34 when wrapped and secured by tying around the rolled panel 12 or panel 14 determines the length to which the panel will extend from the ceiling of the vehicle 10.

The respective widths of panels 12 and 14 are such that they extend beyond the ends of beam sections 16 and 18 and thereby overlap at the point where beam sections 16 and 18 are joined by plug means 20. A multiplicity of two part fastening means 36 such as those of the type used to fasten fabrics together commonly known as "snaps" or a multiplicity of fastening means in the form of sections of material used to fasten fabrics or the like together and sold under the trade name Velcro (TM). is located along the bordering edges of panels 12 and 14 where they overlap. When the two parts of the fastening devices are engaged the panels 12 and 14 are pressed together forming a substantially airtight seam which can be opened or closed by engaging or disengaging the fasteners 36.

Figure 3:
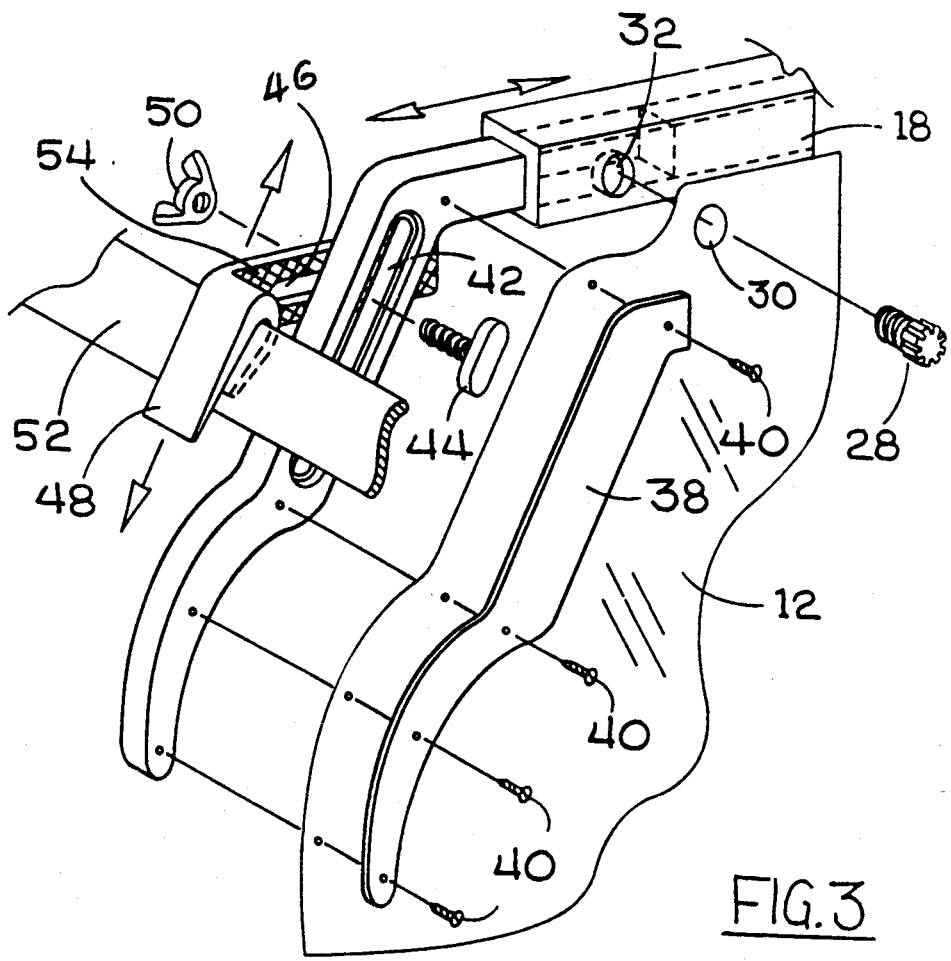
FIG. 3 is an exploded view of details from area 3 of FIG. 1 in which the assembly of the end brackets is shown in detail and the way in which the spring clips relate to the moulding of a vehicle.

As shown in FIG. 3 the outer vertical edges of the panels 12 and 14 extend beyond the ends of beam sections 16 and 18 and are secured to the frontal surface of beam sections 12 and 14 with bracket face plate means 38 which are secured in position with self tapping screw means 40 which extend through openings formed in bracket face plate means 38, through panels 12 and 14 and secured in end brackets 26 thereby clamping the panels 12 and 14 in place between the surfaces of end brackets 26 and bracket face plates 38.

Sufficient slack is left in the material of panels 12 and 14 at the points where end brackets 26 are inserted into the ends of beam sections 12 an 14 to permit the sliding telescopic action of the end brackets 26 into or out of the ends of the beam sections 12 and 14.

Figure 4:
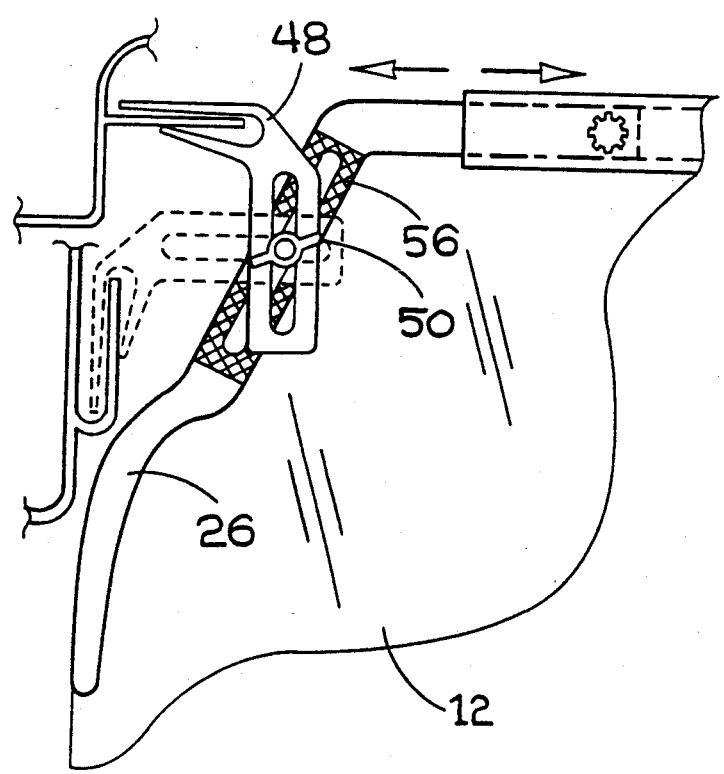
FIG. 4 is an elevational view of the area defined as area 3 in FIG. 1 in which a clear demonstration of the action of the spring clips as applied to both moulding and extrusions or seams is given and in which it is shown how the spring clips are capable of being rotated and placed in a great variety of positions.

End brackets means 26 are preferably constructed of a semi flexible material such as plastic, fibreglass or the like and are formed in the approximate shape of a flattened letter S with a substantially straight middle section joining an upper arm extending in one direction relative to the middle section and a lower arm extending in the opposite direction as illustrated in FIG. 3 and in FIG. 4. this construction permits the flexing of the lower arm in the event that when external pressure is applied such as would occur when a vehicle door is closed allowing the window or other part of the door to press against the outer surface of end bracket 26 it will yield to the pressure and bend inwardly toward the panels 12 and 14. When the pressure is removed the lower arm due to its flexibility will return to its normal resting position and the end bracket 26 will be restored to its original shape thereby retaining a relatively tight seal against the door or its component parts and preventing the flow of air between the different areas of the vehicle 10.

An elongated opening or slot 42 is formed in end bracket 26, extending through the mid section and extending longitudinally from a point located where the end bracket curves in one direction to a point where it curves in the opposite direction thereby being located substantially within the entire length of the straight section of the end bracket 26. The slot 42 is countersunk along one side of the end bracket 26 thereby permitting insertion of a flat headed bolt means 44 whose head is recessed flush with the surface of the end bracket 26 and whose shaft extends through slot 42 and thence through a slot 46 located in spring clip means 48 and is further secured with a wing nut means 50.

Spring clip means 48 is comprised of a semi-flexible material such as plastic or fibreglass or the like and formed in the approximate shape of the upper case letter L. An elongated opening or slot 46 has been formed in the vertical arm of the spring clip 48 extending substantially along its length and parallel with its sides. That section of the clip means 48 described as the lower part of the upper case letter L has been formed to incorporate of two parallel prongs which can be tapered and which are of unequal length, the longer of which comprises that which is located on the outer perimeter of the clip means 48. The formation of the clip means 48 in this manner facilitates the insertion of the tapered prong means by spreading them apart and inserting one prong over or behind that portion of a vehicle 10 which can be moulding 52 or other exposed extrusions such as the seams often found in trucks, vans or the like. The spring action of the prongs which comprise the spring clip 48 insures that when they close there will be a secure attachment made with the moulding 52.

An inner surface area 54 located on the vertical leg of the spring clip 48 is knurled so as to provide a substantially nonskid surface when firmly in contact with the knurled surface area 56 of end bracket 26. A firm contact between surface area 54 with surface area 56 is accomplished through the tightening of wing nut means 50. Spring clip 48 can be rotated and secured through an arc of 180 degrees with its pivot point adjustably located anywhere along that length of the end bracket means 26 where the slot 42 is situated by sliding the bolt means 44 to the desired location and tightening the wing nut means 50. In a like manner spring clip means 48 can be extended or contracted relative to end bracket means 26 and locked in place at any point along the length of spring clip means 16, determined by the length of the slot 42 situated in the spring clip means, through the tightening of wing nut means 50.

The embodiments of the invention in which as exclusive property or privilege is claimed are defined as follows:

1. In a mountable, demountable and collapsible device in the form of a partition for segregating the interior of a vehicle for substantially preventing the flow of heated air or cooled air or air laden with smoke from one area of the vehicle to another comprising:
   (a) main support beam means having end brackets;
   (b) beam section means for assembling or dismantling or folding the main support beam means;
   (c) fixed insert plug means fixed at one of adjacent ends of said beam section means for telescopically extending or contracting the length of the main support beam means;
   (d) threaded bolt means for locking or unlocking the main support means at the length desired;
   (e) said end brackets including means for adjusting position of the partition upwardly or downwardly relative to said end brackets including roof of the vehicle;
   (f) nut and bolt means for locking the partition in multiple positions relative to the roof of the vehicle;
   (g) said end brackets further including means for adjusting the position of the partition inwardly or outwardly relative to the sides of the vehicle;
   (h) nut and bolt means for locking the partition in the desired position relative to the sides of the vehicle;
   (i) spring clip attachment means adjustably connected to said end brackets for removably attaching main support beam means to the vehicle trim or to interior component parts of the vehicle;
   (j) a multiplicity of panel means of flexible material attached to said main support beam means and said end brackets for substantially preventing the movement of air from one area of the vehicle to another;
   (k) cord or ribbon means for securing one or more of the panel means in a rolled position relative to the main support beam.

2. In a partition device as claimed in claim 1, wherein the beam sections means are hollow tubes or bars with tubular ends telescopically connected with said fixed plug means.

3. In a partition device as claimed in claim 2, wherein a hollow recess formed in the other of said adjacent ends of the beam section means contains a spring against which the plug means exerts pressure thereby compressing the spring and urging the two outward ends of the main support beam apart thereby providing a means for wedging of the partition between the sides of the vehicle and increasing its support.

4. In a partition device as claimed in claim 3, wherein the panel means comprise a flexible transparent material.

5. In a partition device as claimed in claim 4, wherein the panel means comprise a flexible opaque material for privacy.

6. In a partition device as claimed in claim 4, wherein the panel means comprise a flexible opaque material a portion of which comprise flexible transparent material.

7. In a partition device as claimed in claim 1, wherein the end bracket means includes:
   i) spring clip fastening means adjustably connected to the end bracket means for rotationally, vertically and horizontally adjusting the attachment point of the spring clip to the moulding trim or other interior component parts of the vehicle thereby controlling the location of the main support beam relative to the roof of the vehicle and relative to the sides thereof.
   ii) said spring clip fastening means adjustably connected to the end bracket means further including means for slidably locating the main support beam in a multiplicity of positions relative to the front and rear of the vehicle.

* * * * *